(12) United States Patent
Berlic et al.

(10) Patent No.: US 9,172,919 B2
(45) Date of Patent: *Oct. 27, 2015

(54) SELECTIVE VIEWING OF A SCENE

(71) Applicant: Mindmancer AB, Gothenburg (SE)

(72) Inventors: Johnny Berlic, Gothenburg (SE); Jan Strandevall, Alingsas (SE)

(73) Assignee: MINDMANCER AB, Gothenburg (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/539,502

(22) Filed: Nov. 12, 2014

(65) Prior Publication Data

US 2015/0070490 A1    Mar. 12, 2015

Related U.S. Application Data

(60) Continuation of application No. 13/495,724, filed on Jun. 13, 2012, now Pat. No. 8,965,047, which is a division of application No. 12/136,242, filed on Jun. 10, 2008, now Pat. No. 8,311,275.

(51) Int. Cl.
*G06K 9/00* (2006.01)
*H04N 7/18* (2006.01)

(52) U.S. Cl.
CPC ............ *H04N 7/183* (2013.01); *G06K 9/00771* (2013.01)

(58) Field of Classification Search
None
See application file for complete search history.

(56) References Cited

U.S. PATENT DOCUMENTS

| | | | |
|---|---|---|---|
| 5,956,424 A | 9/1999 | Wootton et al. | |
| 6,042,235 A | 3/2000 | Machtig et al. | |
| 6,509,926 B1 | 1/2003 | Mills et al. | |
| 6,727,938 B1 | 4/2004 | Randall | |
| 6,744,461 B1 | 6/2004 | Wada et al. | |
| 6,768,563 B1 | 7/2004 | Murata et al. | |
| 6,950,130 B1 | 9/2005 | Qian | |
| 7,227,567 B1 | 6/2007 | Beck et al. | |
| 7,583,815 B2 | 9/2009 | Zhang et al. | |

(Continued)

FOREIGN PATENT DOCUMENTS

| DE | 102007029606 | 1/2009 |
|---|---|---|
| WO | WO0162006 | 8/2001 |
| WO | WO2006070249 | 7/2006 |

OTHER PUBLICATIONS

"Pattern Recognition," [online], Wikipedia, [retrieved on Jul. 6, 2009], [published on Oct. 14, 2007]. Retrieved from the internet: http://web.archive.org/web/20071014205509/http://en.wikioedia.org/wiki/Pattern_recognition.

(Continued)

*Primary Examiner* — Aaron W Carter
(74) *Attorney, Agent, or Firm* — Remarck Law Group PLC

(57) ABSTRACT

Among other disclosed subject matter, a computer-implemented method for performing selective viewing of a scene includes acquiring an image of a real scene using a camera. The method includes identifying, in the acquired image, a first object in the real scene located on a first side of a virtual plane defined for the real scene and a second object located on a second side of the virtual plane. The method includes modifying the acquired image by removing image content corresponding to the identified first object, wherein image content corresponding to the identified second object is not removed based on the second object being located on the second side. The method includes displaying the modified acquired image for a person to view the real scene.

16 Claims, 10 Drawing Sheets

(56) References Cited

U.S. PATENT DOCUMENTS

| | | |
|---|---|---|
| 7,613,322 B2 | 11/2009 | Yin et al. |
| 7,733,369 B2 | 6/2010 | Yin et al. |
| 7,756,596 B2 | 7/2010 | Ozawa |
| 7,783,076 B2 | 8/2010 | Tsunashima |
| 7,822,275 B2 | 10/2010 | Rasheed et al. |
| RE41,977 E | 11/2010 | Matsumoto et al. |
| 7,825,954 B2 | 11/2010 | Zhang et al. |
| 7,855,012 B2 | 12/2010 | Takeshita et al. |
| 7,855,743 B2 | 12/2010 | Sako et al. |
| 7,860,055 B2 | 12/2010 | Hayasaka |
| 7,911,513 B2 | 3/2011 | Garrison et al. |
| 8,145,007 B2 | 3/2012 | Davey et al. |
| 8,154,583 B2 | 4/2012 | Kurtz et al. |
| 8,174,555 B2 | 5/2012 | Border et al. |
| 8,558,892 B2 | 10/2013 | Brodsky et al. |
| 2002/0008758 A1 | 1/2002 | Broemmelsiek et al. |
| 2003/0103139 A1 | 6/2003 | Pretzer et al. |
| 2005/0018879 A1 | 1/2005 | Ito et al. |
| 2005/0123172 A1 | 6/2005 | Henson |
| 2005/0157204 A1 | 7/2005 | Marks |
| 2005/0275723 A1 | 12/2005 | Sablak et al. |
| 2006/0064384 A1 | 3/2006 | Mehrotra et al. |
| 2006/0192853 A1 | 8/2006 | Lee |
| 2006/0268101 A1 | 11/2006 | He et al. |
| 2007/0052803 A1 | 3/2007 | Chosak et al. |
| 2007/0110298 A1 | 5/2007 | Graepel et al. |
| 2007/0115356 A1 | 5/2007 | Kang et al. |
| 2007/0285510 A1 | 12/2007 | Lipton et al. |
| 2008/0117295 A1 | 5/2008 | Ebrahimi et al. |
| 2008/0166015 A1 | 7/2008 | Haering et al. |
| 2008/0174678 A1 | 7/2008 | Solomon |
| 2008/0211903 A1 | 9/2008 | Davey et al. |
| 2008/0259154 A1 | 10/2008 | Garrison et al. |
| 2008/0297586 A1 | 12/2008 | Kurtz et al. |
| 2008/0297587 A1 | 12/2008 | Kurtz et al. |
| 2008/0297588 A1 | 12/2008 | Kurtz et al. |
| 2008/0297589 A1 | 12/2008 | Kurtz et al. |
| 2008/0298571 A1 | 12/2008 | Kurtz et al. |
| 2008/0300010 A1 | 12/2008 | Border et al. |
| 2009/0010546 A1 | 1/2009 | Rossato et al. |
| 2009/0016603 A1 | 1/2009 | Rossato et al. |
| 2009/0195638 A1 | 8/2009 | Caspi et al. |
| 2009/0219379 A1 | 9/2009 | Rossato et al. |
| 2009/0237508 A1 | 9/2009 | Arpa et al. |
| 2010/0119177 A1 | 5/2010 | Suzuki |
| 2010/0149330 A1 | 6/2010 | Salgar et al. |
| 2010/0205667 A1 | 8/2010 | Anderson et al. |
| 2010/0328460 A1 | 12/2010 | Merkel et al. |
| 2011/0191195 A1 | 8/2011 | Lipton et al. |
| 2012/0081500 A1 | 4/2012 | Border et al. |
| 2012/0098854 A1 | 4/2012 | Ohnishi |
| 2012/0327172 A1 | 12/2012 | El-Saban et al. |
| 2013/0108105 A1 | 5/2013 | Yoo et al. |

OTHER PUBLICATIONS

DuFaux F. et al., "Smart Video Surveillance System Preserving Privacy", Proceeds of the Spie, Spie, Bellingham, VA, US, Mar. 1, 2005, vol. 5685, pp. 54-63.

Hewitt, R., "Seeing with OpenCV-Finding Faces in Images," Servo, dated Feb. 2007, pp. 48-52.

Hu, L. et al., "People Re-Detection Using Adaboost with Sift and Color Correlogram," National Natural Science Foundation of China, dated 2008, pp. 1348-1351.

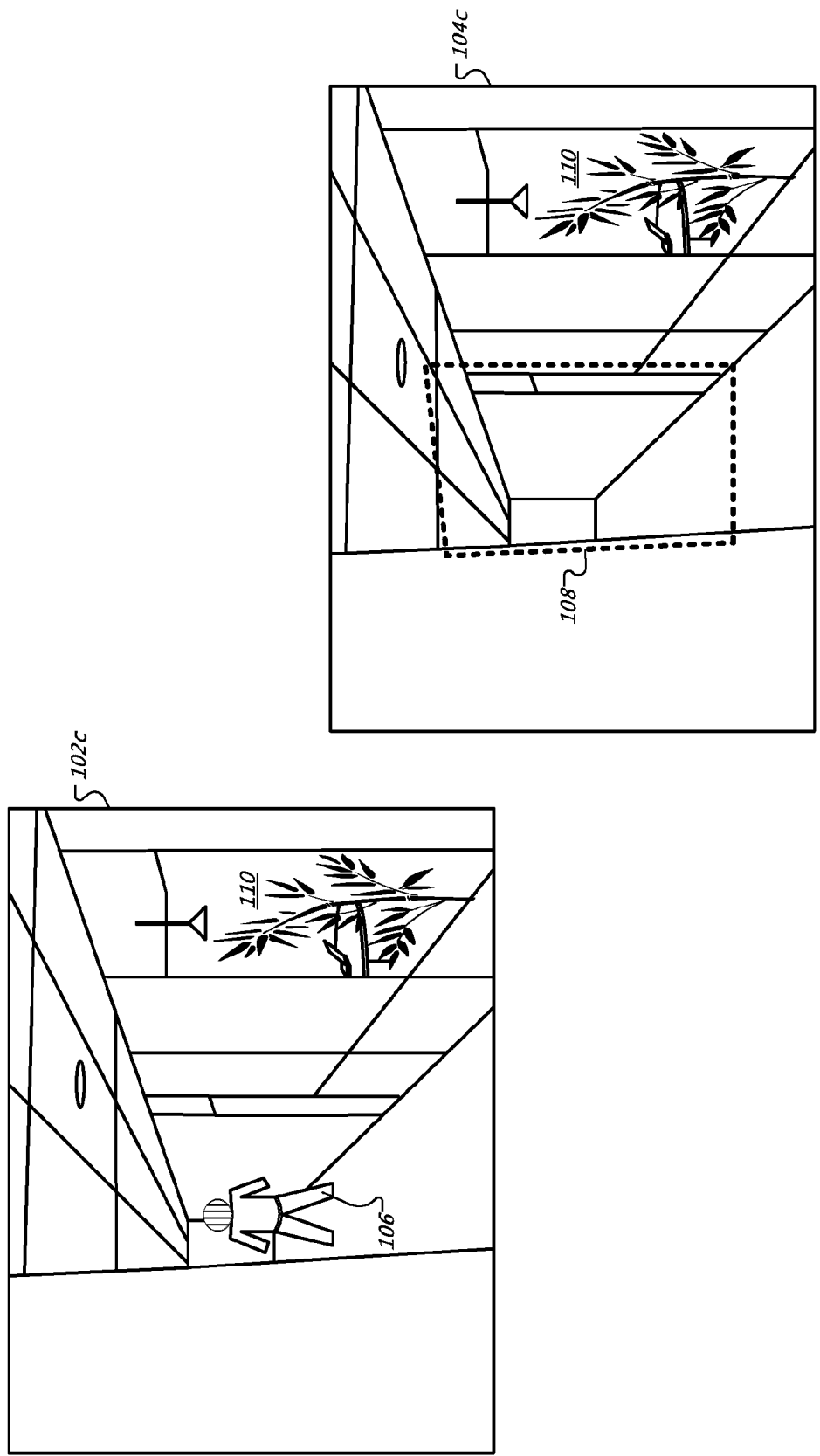

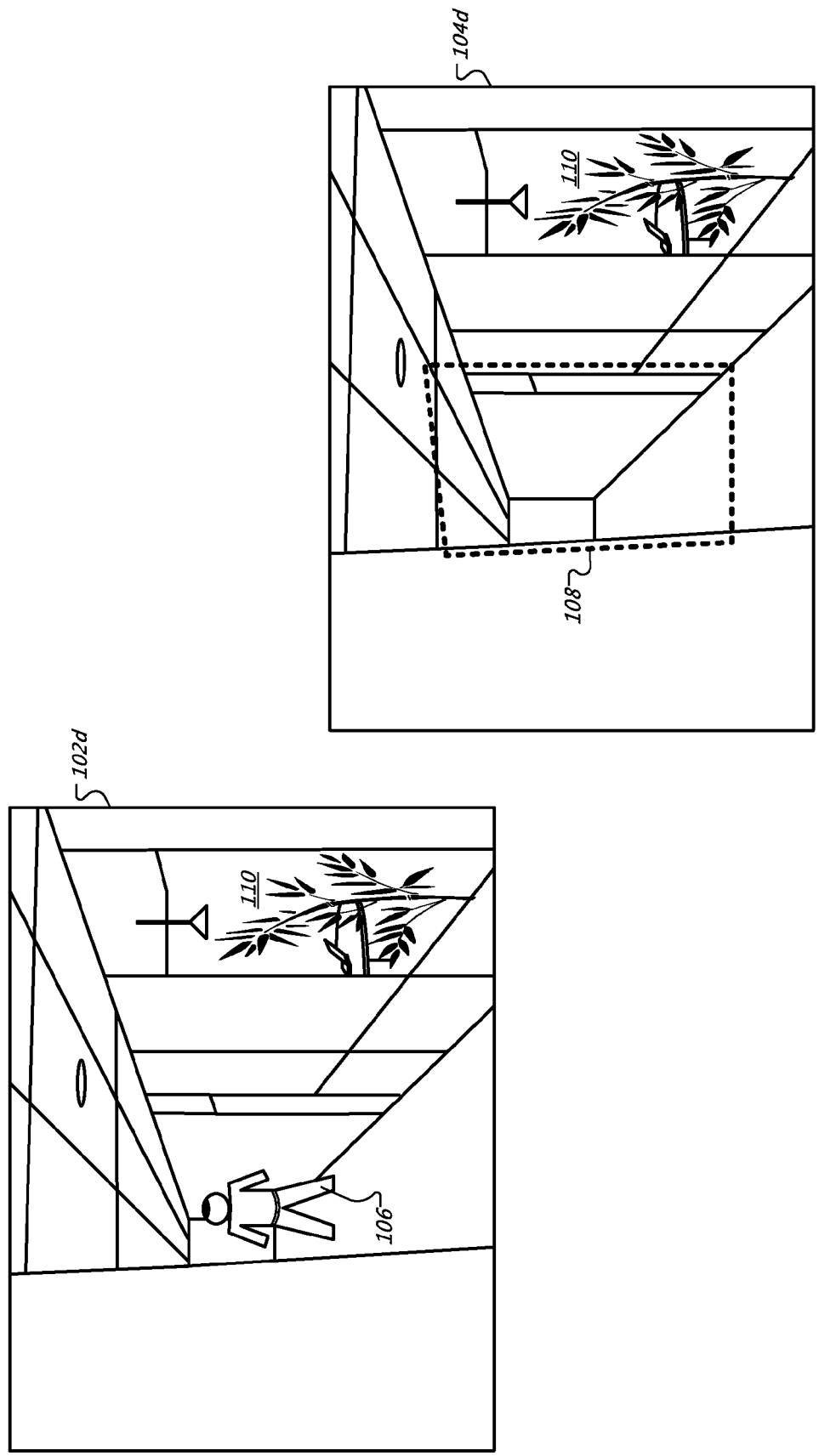

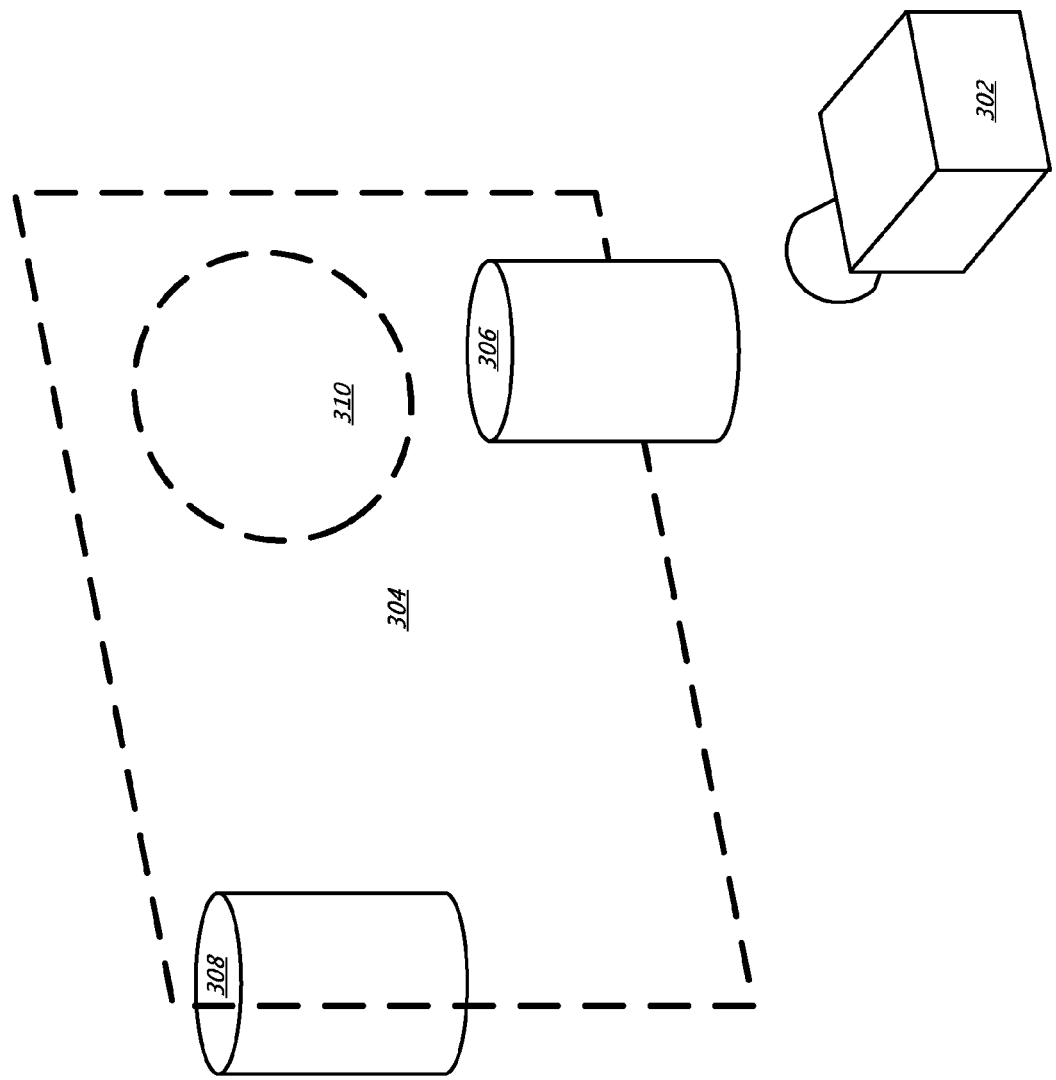

SELECTIVE VIEWING OF A SCENE

CROSS-REFERENCE TO RELATED APPLICATIONS

This application is a continuation of U.S. application Ser. No. 13/495,724, filed Jun. 13, 2012, which is a divisional of U.S. application Ser. No. 12/136,242, filed Jun. 10, 2008, now U.S. Pat. No. 8,311,275. The disclosures of the above applications are incorporated herein by reference in their entirety.

TECHNICAL FIELD

This document relates to selective viewing of a scene.

BACKGROUND

Camera surveillance is frequently used, particularly since the advent of motion cameras that register live images of a scene. For example, surveillance cameras are often used to monitor entrances, important objects and other items of interest. Many types of cameras and photographic techniques have been developed, including conventional video cameras that record moving images on a magnetic tape, for example. Digital image recording is sometimes used.

A situation that can occur is that there is something sensitive or secret in the view of the surveillance camera. There are sometimes laws and/or other regulations as to what matter a surveillance camera can capture. For example, such laws may deem it acceptable to direct the camera toward a private doorway but not to capture any view of a public sidewalk just beyond the doorway. As another example, camera surveillance may be performed to guard matters of great importance, such as classified military premises or trade secret laboratories, against unauthorized people. However, the surveillance operation can be made more difficult if the important object or premise is not to be shown to the person tasked with watching the surveillance image (i.e., the security guard). Attempts at performing surveillance have included masking of a portion of the camera image. However, this may unintentionally obstruct also important parts of the image, and it can render the camera image unnatural and difficult to survey.

SUMMARY

The invention relates to selective viewing.

In a first aspect, a computer-implemented method for performing selective viewing of a scene includes acquiring an image of a real scene using a camera. The method includes identifying, in the acquired image, a first object in the real scene located on a first side of a virtual plane defined for the real scene and a second object located on a second side of the virtual plane. The method includes modifying the acquired image by removing image content corresponding to the identified first object, wherein image content corresponding to the identified second object is not removed based on the second object being located on the second side. The method includes displaying the modified acquired image to a person performing surveillance of the real scene.

Implementations can include any, all or none of the following features. The image can be acquired as part of continuously acquiring a live image of the real scene, and during a duration of the acquired live image the first object can move between a location behind the virtual plane and a location in front of the virtual plane, as seen from the camera. The method can further include modifying the acquired live image so that the first object is visible in the modified acquired live image only when the first object is in front of the virtual plane. The method can further include modifying the acquired live image so that the first object is visible in the modified acquired live image only when the first object is behind the virtual plane. A shape can define the virtual plane, and the method can further include replacing any image contents within the shape with substitute content that does not include the first object. The method can further include acquiring the substitute content by acquiring another image of the real scene while the first object is not present on the first side of the virtual plane. A shape can define the virtual plane, and the method can further include determining that the first object is on the first side by identifying that image content corresponding to at least part of the first object has a predefined location relative to a border of the shape. The image can be acquired as part of continuously acquiring a live image of the real scene, and the method can further include modifying the acquired live image by erasing any image content within the shape and placing substitute content within the shape that does not include the first object; identifying that the first object moves in the real scene, wherein the first object is not visible in the modified acquired live image while the first object is on the first side; determining, based on the identification, that the first object moves past the shape to the second side; and ceasing to remove content corresponding to the first object from the modified acquired live image based on the determination. The method can further include determining that the first object is on the first side by analyzing a size of the first object in the acquired image using a map of the real scene. The method can further include determining that the first object is on the first side by determining a distance from the first object to the camera. The first object can be a human being and the distance can be determined using a size of a part of the human being measured in the acquired image. The virtual plane can be defined at a specific location in a passageway in the real scene such that any object passing through the virtual plane in the passageway is only visible in the modified acquired image while on one of the first and second sides. The virtual plane can be defined by a virtual polygon. The modified acquired image can be displayed to the person substantially in real time. The modified acquired image can be displayed for low-security level observation, and the method can further include recording the acquired image for high-security level observation. A shape can define the virtual plane, and the shape can include at least one hole.

In a second aspect, a computer program product is tangibly embodied in a computer-readable storage medium and includes instructions that when executed by a processor perform a method for performing selective viewing of a scene. The method includes acquiring an image of a real scene using a camera. The method includes identifying, in the acquired image, a first object in the real scene located on a first side of a virtual plane defined for the real scene and a second object located on a second side of the virtual plane. The method includes modifying the acquired image by removing image content corresponding to the identified first object, wherein image content corresponding to the identified second object is not removed based on the second object being located on the second side. The method includes displaying the modified acquired image for a person to view the real scene.

In a third aspect, a computer-implemented method for performing selective viewing of a scene includes continuously acquiring a live image of a real scene using a camera, a virtual polygon being defined for the real scene. The method includes identifying, in the acquired live image, an object that is moving in the real scene. The method includes determining that during a duration of the acquired live image the object moves from a first side past the virtual polygon to a second side, the determination performed by identifying that image content corresponding to at least part of the object crosses a border of the virtual polygon, as seen from the camera, as the object moves past the virtual polygon. The method includes modifying the acquired live image based on the determination so that the object is visible in the modified acquired live image only while located at one of the first and second sides. The method includes displaying the modified acquired live image substantially in real time for a person to view the real scene.

Implementations can include any, all or none of the following features. The first side can be behind the virtual polygon, and the second side can be in front of the virtual polygon, as seen from the camera, and the modification can be performed so that the object is visible in the modified acquired live image only while the object is in front of the virtual polygon as seen from the camera. The first side can be behind the virtual polygon, and the second side can be in front of the virtual polygon, as seen from the camera, and the modification can be performed so that the object is visible in the modified acquired live image only while the object is behind the virtual polygon as seen from the camera.

In a fourth aspect, a computer-implemented method for performing selective viewing of a scene includes acquiring an image of a real scene using a camera, wherein a virtual shape has been defined for the real scene. The method includes modifying the acquired image by removing content forming at least a portion of the virtual shape, the removed content being located on a first side of the virtual shape in the real scene, wherein non-removed content of the virtual shape being located on a second side of the virtual shape in the real scene. The method includes displaying the modified acquired image substantially in real time for a person to view the real scene.

In a fifth aspect, a computer-implemented method for performing selective viewing of a scene includes acquiring an image of a real scene using a camera. The method includes identifying at least a first feature in the acquired image based on the first feature moving in the real scene, wherein the real scene further includes a second feature that is not moving in the real scene. The method includes modifying the acquired image by removing the first feature and not removing the second feature. The method includes displaying the modified acquired image for a person to view the real scene without the first feature.

Implementations can provide any, all or none of the following advantages. Scene viewing can be improved. Camera surveillance can be improved. A real scene that includes sensitive or unwanted matter can be selectively viewed so as to exclude the matter from an image watched by security personnel. Image objects can selectively appear or disappear in camera images based on the object changing its distance relative to the camera. A camera image can be provided that looks natural and is easy to survey. Image-enhancing properties can be provided, for example higher resolution and/or less noise.

The details of one or more embodiments are set forth in the accompanying drawings and the description below. Other features and advantages will be apparent from the description and drawings, and from the claims.

DESCRIPTION OF DRAWINGS

FIG. 3 is a block diagram showing an example relationship between a surveillance camera, a virtual polygon, and objects in a real scene.

Like reference symbols in the various drawings indicate like elements.

DETAILED DESCRIPTION

Figure 1A:
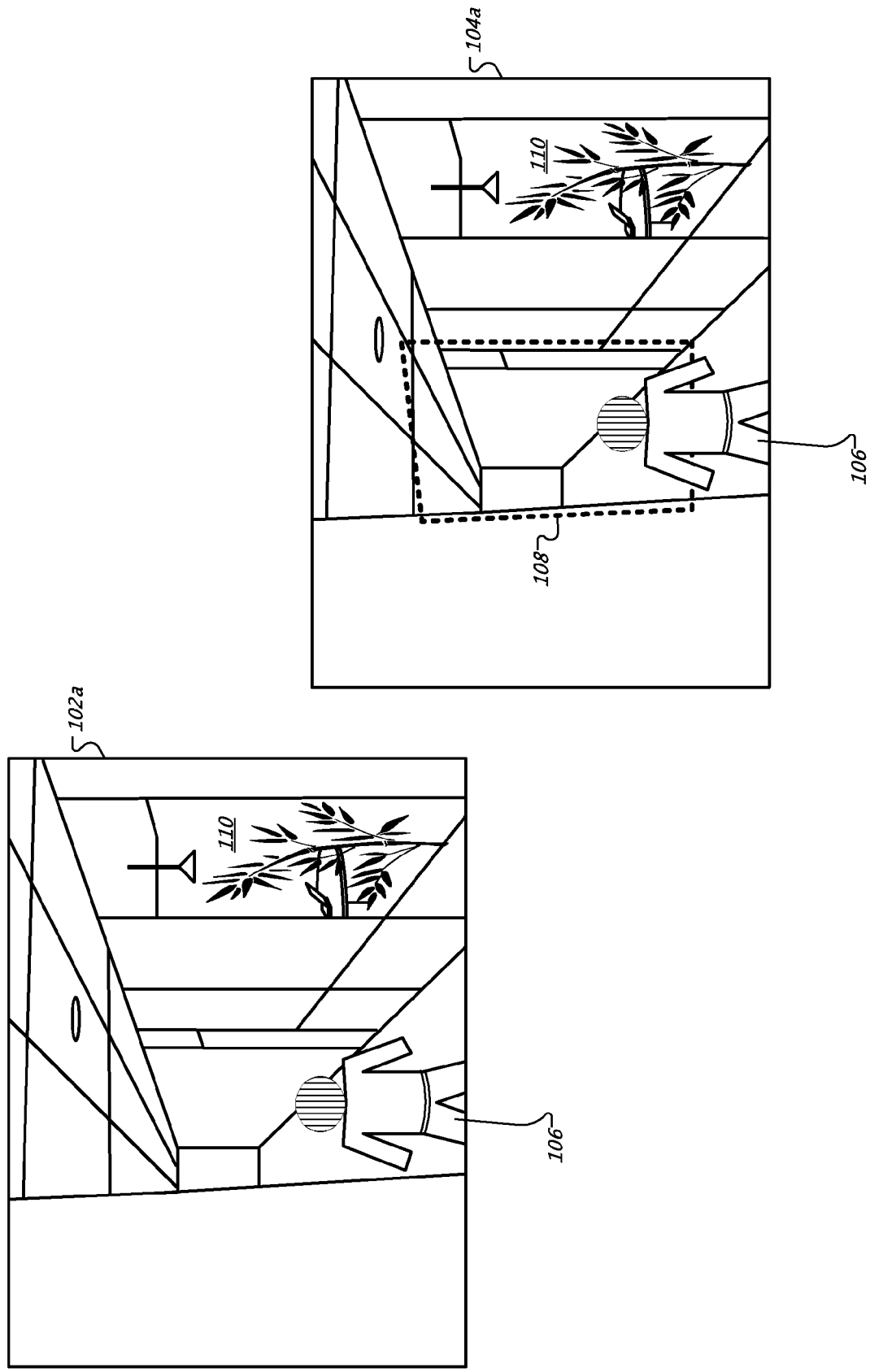
FIGS. 1A-2C show example acquired images and modified images corresponding to a real scene captured by a surveillance camera.

FIGS. 1A-1C and 2A-2C show example acquired images 102a-102f and modified images 104a-104f corresponding to a real scene captured by a surveillance camera. For convenience, the FIGS. will be described in reference to a surveillance system. In general, the surveillance system is configured to perform selective surveillance. For example, the surveillance system can omit one or more regions of a real scene as too sensitive to be viewed by security personnel. As another example, the surveillance system can omit a region of a real scene that does not correspond to property owned by an organization utilizing the surveillance system.

The acquired images 102a-102f correspond to a real scene that is captured by the surveillance camera. For example, the real scene involves a corridor of an organization, wherein security surveillance is being performed. Over time, the acquired images 102a-102f are continuously updated to reflect the current state of the real scene (e.g., in some implementations the acquired images 102a-102f can be selected snapshots from a live image). For example, when the acquired images 102a-102f are updated they can reflect a change in the positioning of a person 106 who moves through the corridor.

A corresponding modified image 104a-104f, respectively, can be generated according to how the surveillance system is configured. For example, the modified images 104a-104f correspond to their respective acquired image 102a-102f optionally with a portion of the content removed. In some implementations, this provides that a person performing surveillance can be shown any or all of the modified images 104a-104f, or the live image stream corresponding to the modified images 104a-104f, and not any of the acquired images 102a-102f. Such an approach can allow the person to perform the necessary surveillance without seeing sensitive image information, i.e., the removed contents. In some implementations, the acquired images 102a-102f are not shown to the person performing the surveillance. That is, only the modified images 104a-104f are then presented to the person performing the surveillance. In some implementations, if the acquired images 102a-102f are not generally presented, the system may nevertheless allow the acquired images 102a-102f to be presented, in real time and/or at a later time, upon receipt of a password or some other form of security credentials (e.g., biometric information or RFID tag), to name two examples. For example, the acquired images 102a-102f, modified images 104a-104f, or both may be encrypted using any number of conventional encryption techniques. Additionally, upon receipt of a password or other security credentials, any of the images 102a-102f and 104a-104f can be decrypted and presented in real time or during a later review of a captured surveillance video.

Moreover, in some implementations, either acquired images 102a-102f, modified images 104a-104f, or both can be recorded. For example, consider a situation where a security alarm is triggered. Upon receipt of an alarm signal, the surveillance system can capture a recording of the event(s) that is provided to security personnel. That is, the modified images 104a-104f can be recorded on computer readable media (e.g., a hard drive, flash drive, optical disk, tape, or any other conventional storage media) and provided to security personnel at some later time. In some implementations, instead of recording both acquired images 102a-102f and modified images 104a-104f, modified images 104a-104f are recorded with additional information that describes a transformation from the modified images 104a-104f to the acquired images 102a-102f. That is, the modified images 104a-104f can be recorded along with one or more transformations (e.g., image deltas) that allow the system to recreate the acquired images 102a-102f from the modified images 104a-104f using the transformation information. In some implementations, these transformations may be applied only upon receipt of a password or other security credentials.

That is, in a particular example, an employee without security clearance can be allowed to view the modified images 104a-104f. Because this observation does not require a security clearance and/or the images are not encrypted, for example, it can be considered a low-security level observation. Another person, in contrast, who has the required security clearance, can be permitted to view the acquired images 102a-102f. In some implementations, the acquired images 102a-102f are recorded in an encrypted form. Because this observation requires security clearance and/or the image is encrypted, for example, it can be considered a high-security level observation.

Objects that move between successive acquired images can be identified by the surveillance system. For example, as the person 106 moves through the corridor, their position changes in the acquired images 102a-102f. Using the change in position between images, the surveillance system can identify that the person 106 is moving. The objects that move can be further analyzed to determine if they should be included in the modified image, or excluded from the modified image. For example, the surveillance system determines if the person 106 should appear in any of the modified images 104a-104f according to the person's position in the real scene. Example determinations include, but are not limited to, a determination according to an object's size, distance from the camera, other metrics generated by analyzing the acquired images 102a-102f, or combinations thereof.

In general, a virtual plane can be defined that specifies a region in the modified image. Objects on a particular side of the virtual plane may be included in the modified image and objects on the other side of the virtual plane may be excluded from the modified image. As one example, in reference to FIGS. 1A-2C, objects on the near side of (i.e., in front) a virtual polygon 108 are displayed while objects on the far side of (i.e., behind) the virtual polygon 108 are excluded from the modified images 104a-104f.

Here, the virtual polygon is formed by a two-dimensional shape defined in a computer system that receives and processes the acquired images 102a-f. The virtual polygon 108 defines a virtual plane in the real scene. The virtual plane can extend in any direction and be placed anywhere relative to the real scene. In addition, more than one virtual plane can be specified for any particular real scene. For example, an additional virtual plane may be optionally specified to remove objects located in an office 110. In other words, an additional virtual plane can be placed in front of the office's window and configured such that objects behind the virtual plane are excluded from the modified images. That is, there may be many virtual walls configured to remove objects in any number of regions in the acquired images 102a-102f. Furthermore, the virtual plane can be shaped in any form including free-form shapes or any other amorphous shapes, to name two examples. In some implementations, the virtual wall may include at least one hole. An example of a holes is described in more detail below.

The virtual plane can be defined in many different ways, such as using a virtual polygon or any other shape. For example, in reference to FIGS. 1A-2C, the virtual polygon 108 is used to define the virtual plane. In FIGS. 1A-2C, the virtual polygon 108 is shown visible for clarity of description, but in some implementations, the virtual polygon or other shape may not be visible to someone viewing the modified images 104a-104f. As one example, a surveillance system application can be configured to display or remove the virtual polygon 108 according to received user input.

Moreover, the virtual plane can be configured so that the system displays objects that are in front of the virtual plane and removes objects that are behind the virtual plane. As another example, the virtual plane can also be configured so that the system displays objects that are behind the virtual plane and removes objects that are in front of the virtual plane. In general, when objects are removed to form a modified image, a portion of the acquired image that contained the removed objects can also be removed. For example, a portion of the acquired image corresponding to the virtual polygon 108 in modified images 104a-104f can be removed. In FIGS. 1A-2C, the modified images 104a-f are shown such that certain content (with the appearance of the remainder of the corridor) is seen inside the virtual polygon 108. However, as will be described below, such content within the virtual polygon need not be an actual image from the scene, or may not have been captured at the same time as the rest of the content in the modified image; rather, dummy contents can be placed inside the virtual polygon to give the otherwise live image of the real scene a natural appearance.

That is, in some implementations, a portion of the modified image that is excluded can be replaced with substitute content. For example, in reference to FIGS. 1A-2C, the region of the image specified by the virtual polygon 108 can be sampled over time in the acquired images 102a-102f to generate a substitute image used to replace the region defined by the virtual polygon 108 when generating a modified image (e.g., any of modified images 104a-104f). In other words, a substitute image can be generated for the region corresponding to the virtual polygon 108 by averaging appropriate pixel values in the acquired images 102a-102f over time. In some implementations, the substitute image can be generated by averaging each of the previously captured acquired images. For example, in reference to FIGS. 1A-2C, the substitute image for modified image 104f can be generated by averaging the appropriate pixel values of all of the acquired images 102a-102f. In other implementations, the substitute image can be generated by averaging appropriate pixel values in a subset of the acquired images 102a-102f.

The surveillance system can determine the position of an object in the real scene according to a location of a portion of the object. For example, if the base of the object is lower on the image than the lowest portion of the virtual plane, then the object can be considered to be in front of the virtual plane. Moreover, the system can determine if portions of objects (e.g., the feet, head, and/or arms of person 106) can be considered to be part of a single object. For example, a gradient that specifies the movement of each portion of each object can be determined. Portions of objects with substantially similar gradients may be considered to be the same object. In addition, a distance measurement can be used to calculate the position of the object in the image. For example, a transformation can be constructed using the perspective view of the surveillance camera and a map of the area that is being acquired. The transformation can be applied to the objects in the images to determine a distance between the objects and the surveillance camera.

Figure 1B:
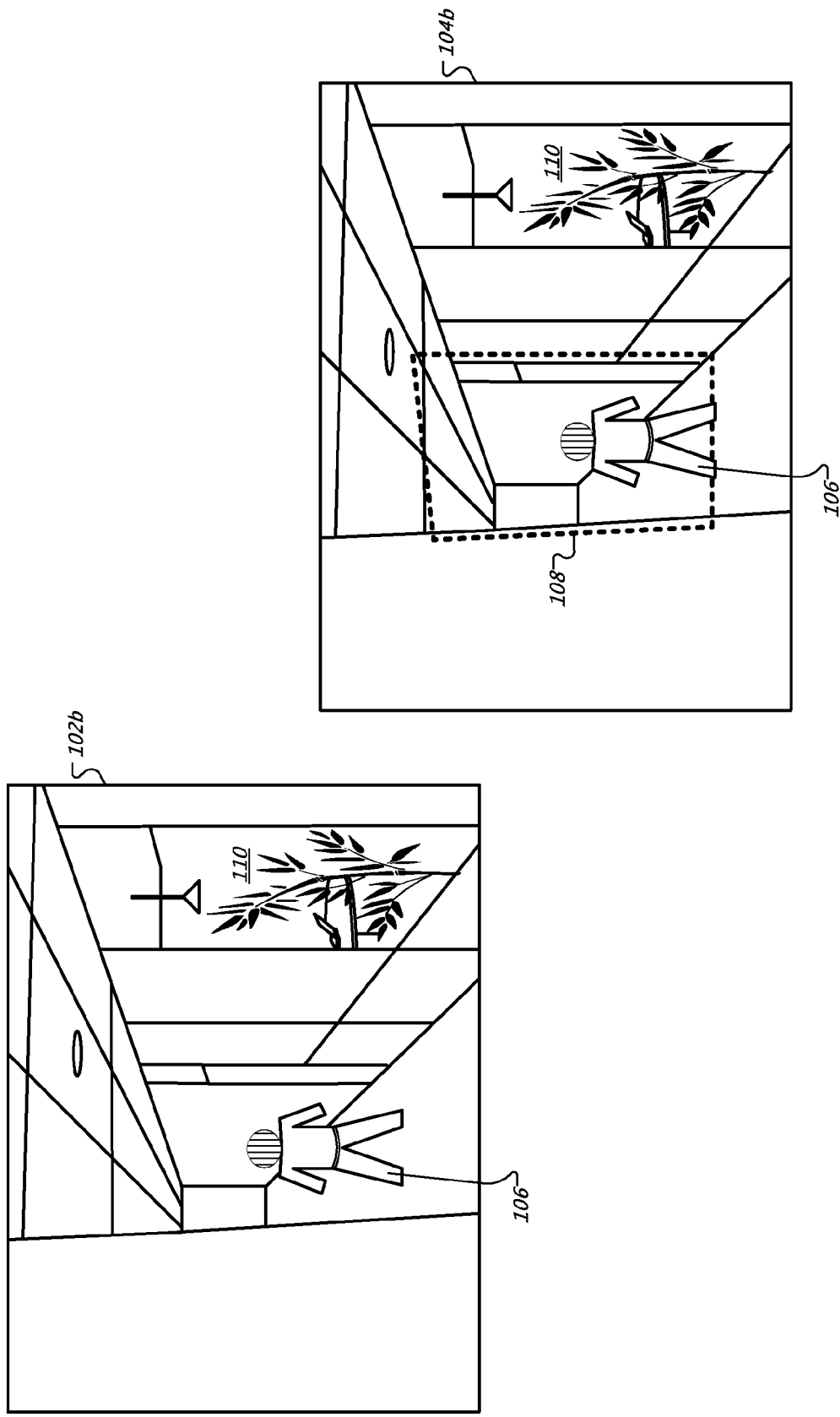

In reference to FIGS. 1A-1C, the person is walking away from the surveillance camera. The images shown in reference to FIGS. 1A-1C are snapshots of a time sequence of live images (i.e., in a video clip). For example, the acquired images 102a-102c show the person 106 walking away from the surveillance camera along a corridor. The modified images 104a-104b, in contrast, show the person 106 as they are walking only until the person 106 reaches a predetermined distance from the viewer in the corridor and thereafter the person will not be visible in the modified image 104c or any other modified image in which the person 106 is beyond the predetermined distance.

As noted above, FIGS. 1A-1C show a real scene where a person walks away from a surveillance camera along a corridor. Particularly, FIG. 1A represents the real scene where the person 106 first appears in the view of the surveillance camera. As illustrated in the examples of FIG. 1A-1C, the virtual polygon 108 in the modified image 104a is filled with substitute content. That is, some or all the image contents inside the virtual polygon 108 in these figures is not the actual image contents from the acquired images but rather some other contents. For example, because the person 106 is determined to be on the second side of the virtual plane (e.g., the base of the person (e.g., the person's legs) is below the base of the base of the virtual plane), the system does not exclude the person from the modified image 104a. This can mean that only the part of the virtual polygon outside the person's upper body is replaced with substitute content.

FIG. 1B represents the real scene where the person is on the verge of crossing a threshold between the first side of the virtual plane and the second side of the virtual plane. Because the base of the person (e.g., the person's feet) is still slightly below the base of the virtual plane, the system does not exclude the person from the modified image 104b. In addition, because the position of the person is determined to be at the threshold of the virtual plane 108, the person's position triggers the removal process that is illustrated in FIG. 1C.

FIG. 1C represents the real scene where the person continues to walk away from the virtual camera. Because the person is determined to be on the first side of the virtual plane (e.g., the base of the person is above the lower border of the virtual plane), the system excludes the person from the corresponding modified image 104c. In contrast, the person remains visible in the acquired image 102c. In addition, because the person 106 is excluded from the modified image, the substitute image generated for the virtual polygon 108 substantially fills the virtual polygon 108. Because the modified image in this example has substitute content that looks like the far end of the corridor, the image looks natural and is easy to survey. In some instances, the modified image 104c is essentially indistinguishable from an acquired (unmodified) image of an empty corridor where no content has been excluded and that does not have any substitute content.

Figure 2B:
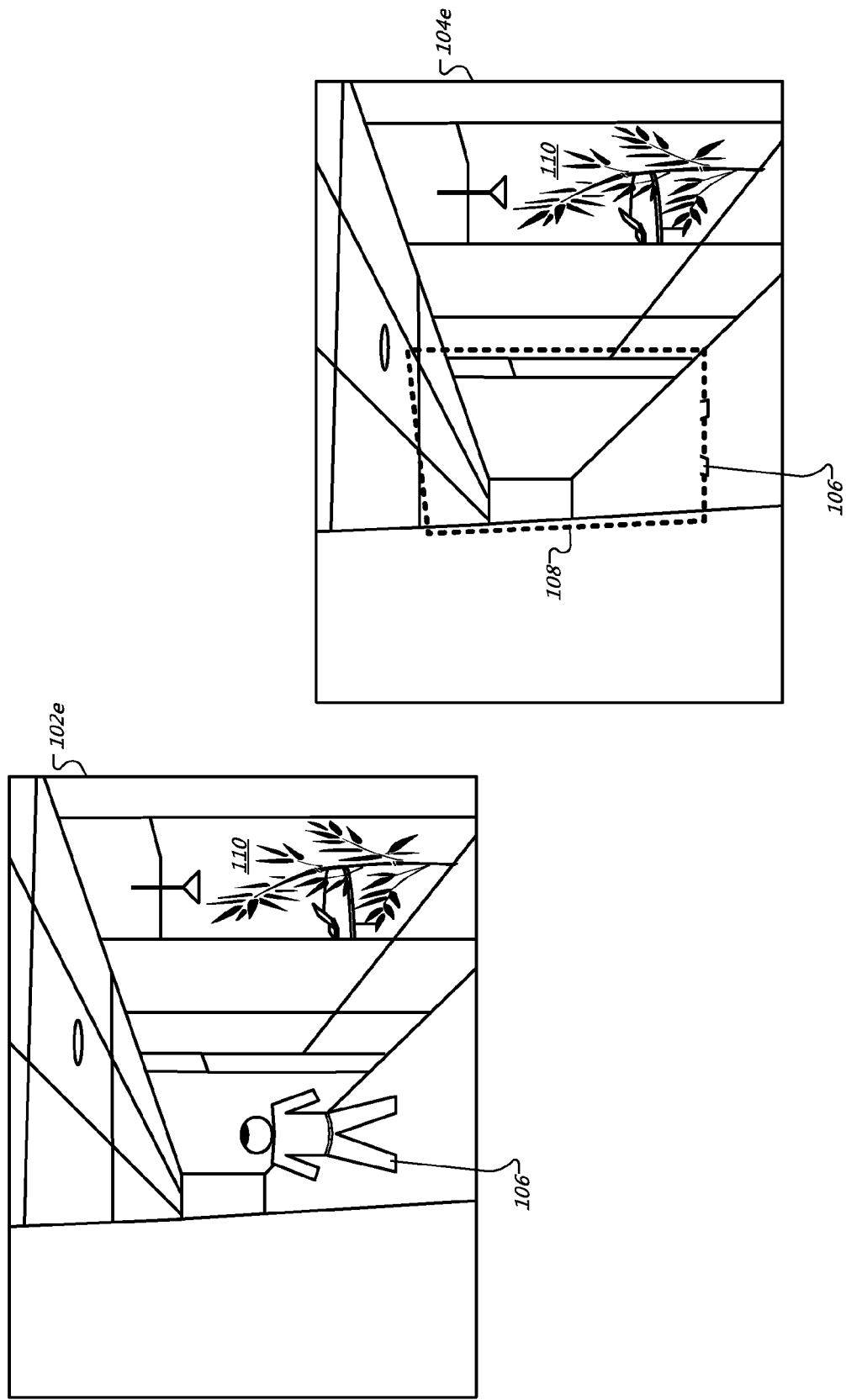
Figure 2C:
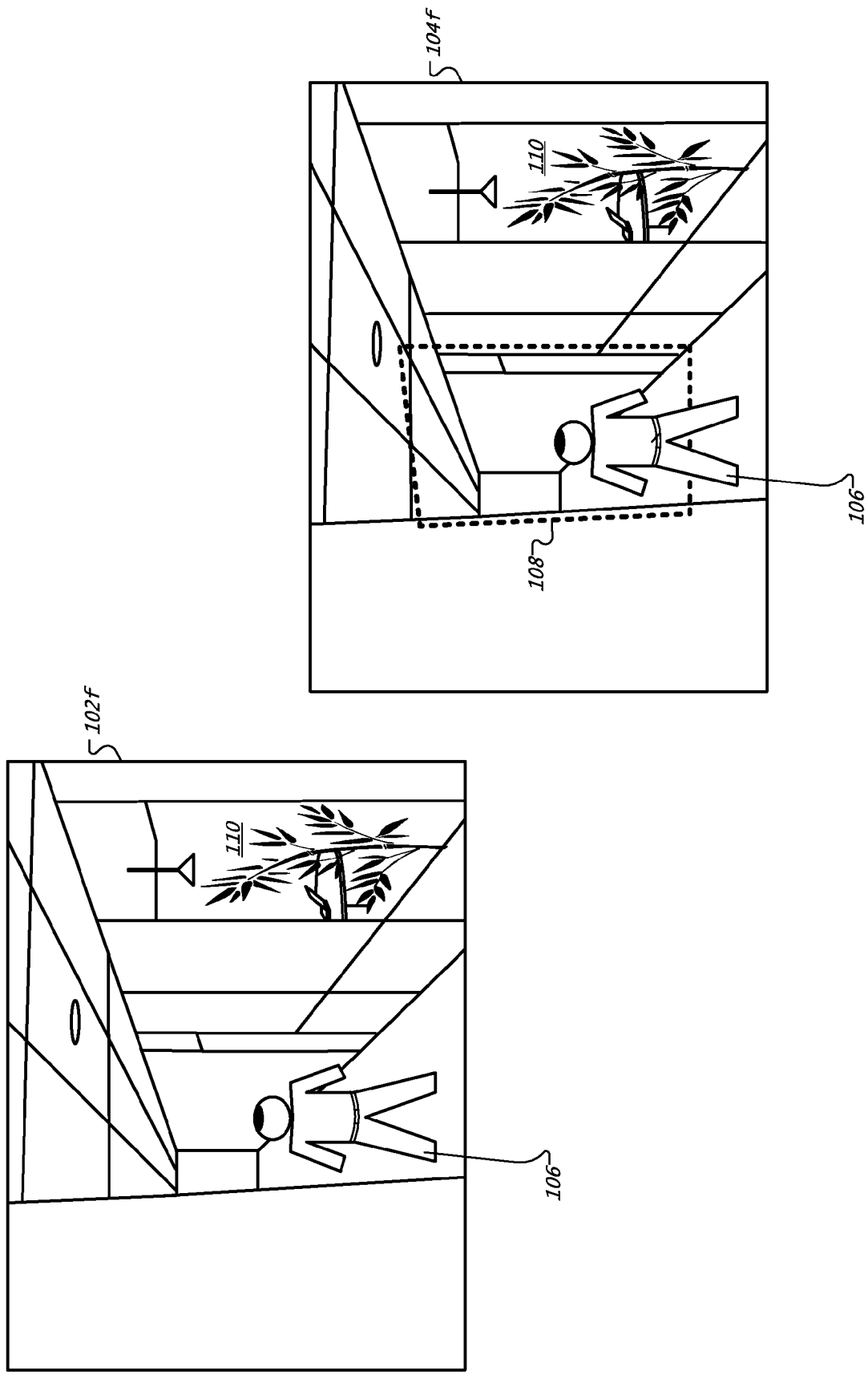

In reference to FIGS. 2A-2C, the person is now instead walking toward the surveillance camera. As described in reference to FIGS. 1A-1C, the images shown in reference to FIGS. 2A-2C are snapshots of a time sequence of live images (i.e., in a video clip). For example, the acquired images 102d-102f show the person 106 walking toward the viewer along a corridor. The modified images (e.g., modified image 104f) show the person 106 only after the person 106 reaches a predetermined distance from the viewer in the corridor. Prior to reaching the predetermined distance, the person 106 is not visible in the modified images (e.g., in modified images 104d-104e) although the person is included in the acquired images 102d-f.

FIG. 2A represents the real scene where the person 106 begins to walk toward the surveillance camera from the far end of the corridor. Because the person 106 is determined to be on the first side of the virtual plane, the system continuously excludes the person 106 from the corresponding modified image 104d. In addition, because the person 106 is excluded from the modified image, the substitute image generated for the virtual polygon 108 substantially fills the virtual polygon 108.

FIG. 2B represents the real scene where the person 106 has just crossed the threshold between the first side of the virtual plane and the second side of the virtual plane. Because the system has detected that the person's feet are below a border of the virtual polygon, and thus the person is on the second side of the virtual plane, the system triggers the cessation of the exclusion of the person 106 from the modified images that is illustrated in FIG. 2C.

FIG. 2C represents the real scene where the person continues to walk towards the surveillance camera. Because the person is determined to be on the second side of the virtual plane, the system does not exclude the person from the modified image 104f. The person is therefore visible in the modified image 104f. In addition, because the person 106 is not excluded from the modified image, only the part of the virtual polygon 208 outside the person's body is replaced with substitute content.

In some implementations, the distance between an object and the surveillance camera can be determined based on a size of the object. For example, when the object is a human being, their distance can be determined based on registering the face of the person and measuring the size of the face. Because human faces (e.g., of adults) tend to be approximately of similar size, the measured size can be used to estimate how far away the person is from the surveillance camera. Other distance determination techniques can be used.

Some examples herein describe the use of a surveillance cameras. In some implementations, however, the techniques described herein may be used in other image capture activities that do not involve a surveillance camera. For example, consider a situation where a photographer wants to capture an image of a road where cars are constantly driving by so the photographer cannot get a clear shot. By specifying one or more virtual walls, the photographer can selectively remove the cars from the scene. As another example, consider a situation where a tourist wants to take a picture of their wife in front of the Sphinx but lots of other people are moving around in the background. By specifying one or more virtual walls, the tourist can remove the other people, generating an image of just his wife and the Sphinx. That is, a camera (e.g., still camera, mobile phone camera, web-camera, or other cameras) may be configured with an application that allows any photographer to selectively remove one or more objects from a photograph by specifying one or more virtual walls.

Another exemplary implementation is to selectively remove certain subject matter from a scene. For example, assume that a person seeks to make a video recording of someone standing in or near a busy location (e.g., Times Square). An unmodified video recording of the person is likely to have some amount of traffic visible in the view. With proper image processing, however, some of all of the traffic content can be selectively removed to form a modified video recording that contains less or no traffic in the view but which retains the stationary elements of the real scene, such as surrounding buildings, which may be of greater interest. In some implementations, therefore, such processing can be performed by defining a virtual plane that covers the whole image sought to be captured (i.e., not merely covering a portion of the image as described in another example herein). Based on the defined virtual plane, objects or other features that move in the real scene (e.g., the traffic) can be identified based on their motion. These identified features can then be selectively removed when generating a modified video recording. Buildings, people standing still, and/or other non-moving or slow-moving features, in contrast, can be left in the modified image.

For example, an image of a real scene such as a landscape can be acquired using a camera. This can be a relatively sophisticated camera such as those often used in shooting full-length motion pictures, or a consumer market camera such as those often used by individuals on vacation, to name a few possibilities. A first feature can be identified in the acquired image based on the first feature moving in the real scene. For example, one or more cars, taxis or buses can be identified based on their motion. The real scene can further include a second feature that is not moving in the real scene. For example, this can include a person standing relatively still and/or a building. The acquired image can be modified, either by processing performed in the camera or by separately processing recorded information, to remove the first feature but not the second feature. The modified acquired image can be displayed for a person to view the real scene without the first feature. For example, the modified image can be displayed as a playback function on the consumer camera or as part of the created motion picture.

Processing of an acquired image can have further advantages. For example, an algorithm used in removing image features according to some examples described herein can have image-enhancing properties. In some implementations, an acquired landscape picture that is modified can appear to have higher resolution with less noise than the camera produces when taking a single snapshot (i.e., an ordinary photo).

FIG. 3 is a block diagram schematically showing an example relationship between a surveillance camera 302, a virtual polygon 304, and objects 306 and 308 in the real scene. The surveillance camera 302 can be any camera. Examples include various dome cameras, color cameras, progressive scan cameras, mobile phone cameras, web-cams, or another wireless or wireline camera available from multiple vendors. The surveillance camera 302 is capable of acquiring a number of images corresponding to a live feed of a real scene, or snapshots thereof, to name a few examples. In general, the number of images captured during a particular time interval corresponds to how the surveillance camera is configured. For example, one surveillance camera may be configured to capture 10 frames (i.e., images) per second, while another surveillance camera may be configured to capture 30 frames per second.

A virtual polygon (e.g., polygon 304) can be defined in a computer system to which the surveillance camera is connected to provide that objects on a particular side of the virtual polygon are included in the modified images and objects on the other side of the polygon are excluded from the modified images. For example, the virtual polygon 304 can be used to define a virtual plane. If the virtual polygon has a sufficient size compared to the physical configuration of the real scene, objects cannot circumvent the inclusion and/or exclusion by moving through areas not covered by the virtual polygon 304.

In the following description of the example shown in FIG. 3, the terms "virtual plane" and "virtual polygon" are sometimes used interchangeably.

Over time, objects may move within the real scene. For example, either of objects 306 and 308 may move. In some scenarios, the objects 306 and 308 may cross over to a different side of the virtual polygon 304. For example, object 306 may cross from the front of the virtual polygon 304 to the back of the virtual polygon 304. In some implementations, when an object crosses the threshold of the virtual polygon 304, the surveillance system triggers the execution of one or more processes of inclusion and/or exclusion. Moreover, objects may cross to different sides of the virtual polygon 304 any number of times and are excluded or included in the modified images accordingly.

In some implementations, objects that are determined to be in front of the virtual polygon 304 are removed while objects behind the virtual polygon 304 remain. For example, the system can determine the location of the base of object 306 and/or object 308. Because the base of object 306 is determined to be below the base of the virtual polygon 304, object 306 can be removed when generating a modified image. Conversely, if the base of object 308 is determined to be above the base of the virtual polygon 304, object 308 can be included when generating a modified image. In other implementations, objects that are determined to be behind the virtual polygon 304 can be removed while objects in front of the virtual polygon 304 can remain.

In some implementations, the virtual plane 304 is a free-form shape and may include one or more holes 310. For convenience, the hole 310 is depicted as a circle, however, the hole may be of any shape or size and may occupy any position within the virtual plane 304. The hole 310 can be generated when the virtual wall 304 is specified, or can be generated after the virtual plane 304 is specified. For example, the security personnel may provide user input corresponding to one or more drawing operations on the virtual plane 304. In response, the surveillance system generates a hole 310 of a particular shape and size according to the received user input. In contrast to the virtual wall 304, the hole 310 does not remove objects from the modified image. For example, if the virtual plane 304 is configured to remove objects that are in front of the virtual plane 304, the hole 310 may present any or all of object 306, if portions of object 306 are inside hole 310 as seen from the camera 302. As another example, if the virtual plane 304 is configured to remove objects that are behind the virtual plane 304, the hole 310 may present any or all of object 308, if portions of object 308 are inside hole 310 as seen from the camera 302. That is, the virtual plane 304 can include one or more regions where objects are not removed, allowing the security personnel to see portions of objects in the hole.

Figure 4:
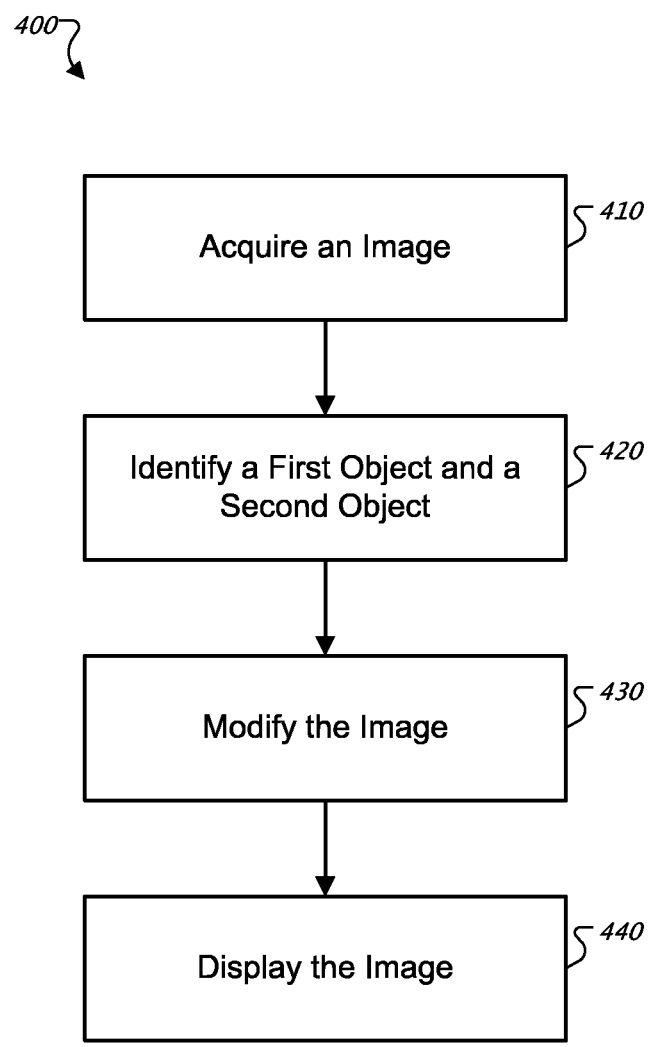
FIG. 4 is a flow chart showing an example process for performing selective surveillance of a scene.

FIG. 4 is a flow chart showing an example process 400 for performing selective viewing of a real scene. Process 400 can be performed by a processor executing instructions in a computer-readable medium. In some implementations, the process 400 can be executed continuously according to the configuration of a surveillance system. For example, if the camera is configured to capture 30 images per second, process 400 may be executed with a suitable frequency to process images captured at that pace.

In step 410, the system acquires an image of a real scene using a camera. For example, in reference to FIGS. 1A and 3, camera 302 can be used to acquire image 102a. The acquisition of the image can be accomplished using any of a number of techniques and/or camera types.

Once the system acquires the image, in step 420, the system identifies a first object in the real scene located on a first side of a virtual plane and a second object located on a second side of the virtual plane. For example, in reference to FIG. 1A, the far end of the corridor can be identified as being on the first side, and the person 106 on the second side, of the virtual polygon 108. Similarly, in FIG. 2A, the office 110 can be identified as being on the first side, and the person 106 on the second side, of the virtual polygon 108.

In step 430, the system modifies the acquired image by removing image content corresponding to the identified first object. Moreover, image content corresponding to the identified second object is not removed based on the second object being located on the second side. For example, in reference to FIG. 1A, the person 106 is not removed but the far end of the corridor is replaced in the modified image with substitute content. Similarly, in FIG. 2A, the office 110 is not removed but the person 106 is replaced in the modified image with substitute content. Examples of modifying acquired images are described below.

In step 440, the system displays the modified image for a person to view the real scene. For example, in reference to FIGS. 1A-2C, modified images 104a-104f can be displayed to a security guard on any kind of display device. In these implementations, the modified images 104a-104f may be displayed without displaying the acquired images 102a-102f. In addition, in some implementations, the modified images 104a-104f may be displayed without displaying the virtual polygon 108.

Figure 5:
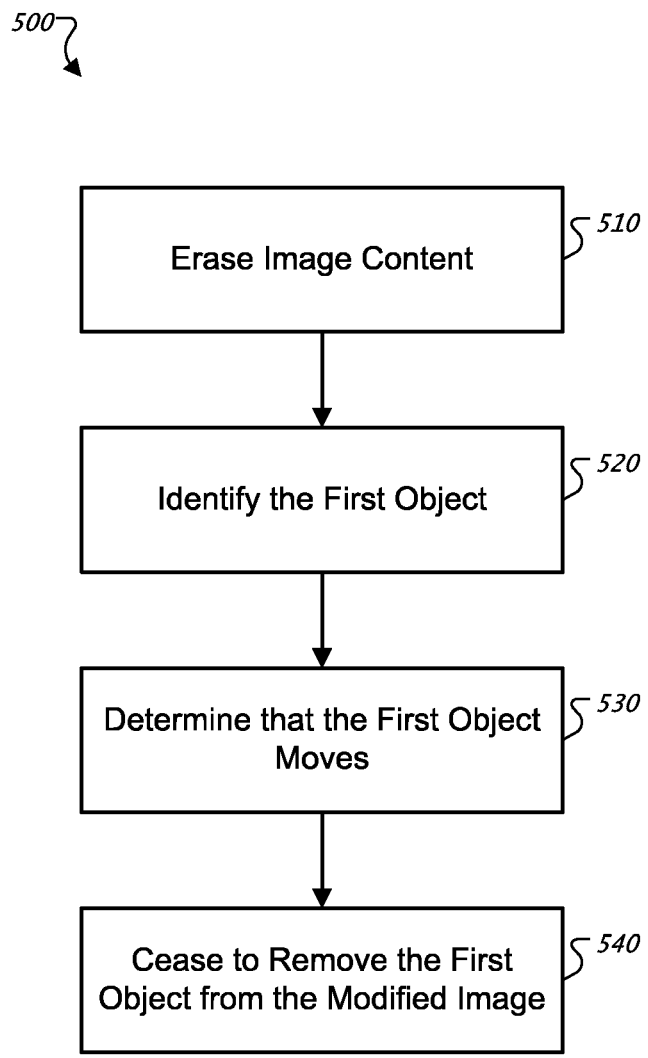
FIG. 5 is a flow chart showing an example process for continuously acquiring an image of a real scene.

FIG. 5 is a flow chart showing an example process 500 for continuously acquiring a live image of the real scene. Process 500 can be performed by a processor executing instructions in a computer-readable medium. In some implementations, process 500 can be executed during process 400. For example, process 500 may be executed during step 430 of process 400.

In step 510, the system modifies the acquired live image by erasing any image content within the virtual polygon and placing substitute content within the polygon that does not include the first object. For example, in reference to FIG. 1A, the system can erase the content corresponding to the far end of the corridor inside the virtual polygon 108.

In step 520, the system identifies that the first object moves in the real scene. The system can use any applicable motion detection algorithm to detect the motion of the objects in the scene. One example motion detection algorithm is core background subtraction. In general, core background subtraction ignores or otherwise disregards a portion of the image that is determined to be substantially similar to a previous image. In some implementations, the pixel values can be compared to determine if they contain substantially similar values. For example, in reference to FIGS. 1A and 1B, if core background subtracting were used on the acquired image 102b, the system may ignore everything but the person 106 and the nearby area around person 106, because only those pixel values would be substantially different between the images 102a and 102b.

In step 530, the system determines based on the identification in step 520 that the first object moves past the virtual polygon to the second side. In general, the system determines the location of the base of the object and compares it to the base of the virtual polygon. For example, in reference to FIG. 2B, the system determines that the base of person 106 has moved past the virtual polygon 108 (e.g., as illustrated by the person's feet in the modified image 104e).

In step 540, the system ceases to remove content corresponding to the first object from the modified acquired live image based on the determination in step 530. For example, in reference to FIG. 2C, the system ceases to remove person 106 when generating the modified image 104f. That is, the person 106 is included in the modified image 104f, and the virtual polygon 108 is partially filled with content in areas of the virtual polygon 108 that do not include the person 106.

In some implementations, the camera can pan. In such implementations, step 520 may be modified to account for the motion of the camera when determining which objects are moving in the scene. For example, optical flow may be used to track objects through a series of acquired images of the real scene. That is, the motion of the camera can be measured and subtracted from the motions of the objects determined by the system. This approach allows the system to determine which objects are moving relative to each other, and which objects are only moving relative to the camera. In such implementations, the objects that move relative to each other are identified and a determination is made by the system if those objects should be included or excluded from the modified images as described above.

Figure 6:
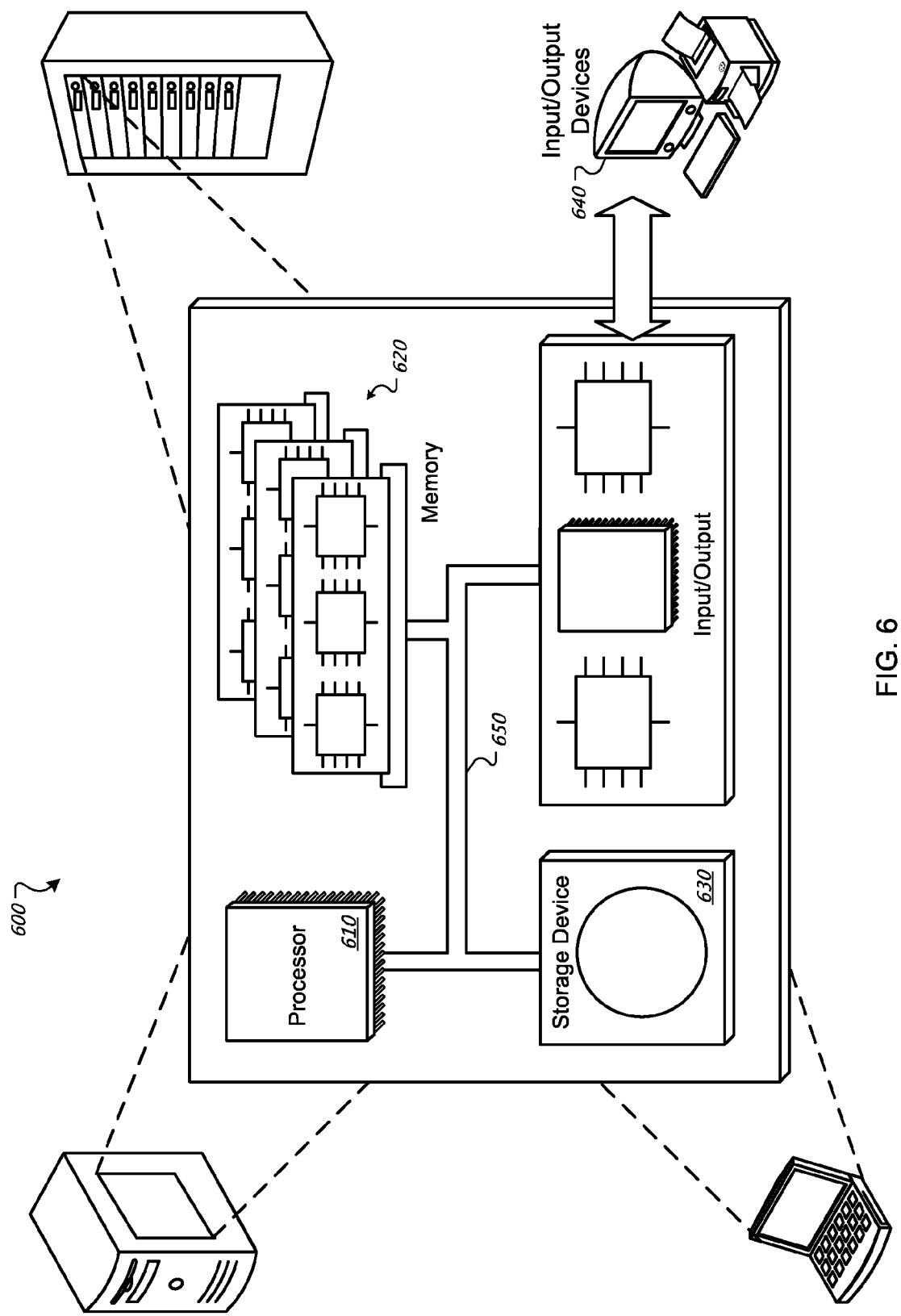
FIG. 6 is a block diagram of a computing system that can be used in connection with computer-implemented methods described in this document.

FIG. 6 is a schematic diagram of a generic computer system 600. The system 600 can be used for the operations described in association with any of the computer-implement methods described previously, according to one implementation. The system 600 includes a processor 610, a memory 620, a storage device 630, and an input/output device 640. Each of the components 610, 620, 630, and 640 are interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 may be a floppy disk device, a hard disk device, an optical disk device, or a tape device.

The input/output device 640 provides input/output operations for the system 600. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments have been described. Nevertheless, it will be understood that various modifications may be made without departing from the spirit and scope of this disclosure. Accordingly, other embodiments are within the scope of the following claims.

What is claimed is:

1. A computer-implemented method for performing selective viewing of a scene, the method comprising:
   acquiring an image of a real scene using a camera;
   identifying at least a first feature in the acquired image based on the first feature moving in the real scene, wherein the real scene further includes a second feature that is not moving in the real scene;
   modifying the acquired image by removing the first feature and not removing the second feature; and
   displaying the modified acquired image for a person to view the real scene without the first feature,
   wherein identifying the at least first feature in the acquired image comprises:
      defining a virtual plane in the image that separates image features based on which side of the virtual plane the image features are located; and
      determining that the first feature is located on a particular side of the virtual plane,
   wherein the virtual plane is defined at a specific location in a passageway in the real scene such that any feature passing through the virtual plane in the passageway is only visible in the modified acquired image while on one of the first and second sides.

2. The computer-implemented method of claim 1, further comprising identifying that a size of the first feature or a distance of the first feature from the camera corresponds to a size or distance, respectively, of features that have been specified for removal,
   wherein the first feature is removed from the acquired image in response to identifying that the size of the first feature or the distance of the first feature from the camera corresponds to the size or distance, respectively, of features that have been specified for removal.

3. The computer-implemented method of claim 2, wherein the virtual plane comprises a polygonal plane.

4. The computer-implemented method of claim 2, wherein the virtual plane spans an entirety of the acquired image.

5. The computer-implemented method of claim 1, wherein the first feature comprises a face of a person.

6. The computer-implemented method of claim 1, wherein the camera comprises a surveillance camera.

7. The computer-implemented method of claim 1, wherein removing the first feature from the image comprises replacing the first feature with background features that simulate how the real scene would appear had the image been captured by the camera without the first feature being present in the real scene.

8. A non-transitory computer-readable media having instructions stored thereon that, when executed by a processor, cause performance of operations comprising:
   acquiring an image of a real scene using a camera;
   identifying at least a first feature in the acquired image based on the first feature moving in the real scene, wherein the real scene further includes a second feature that is not moving in the real scene;
   modifying the acquired image by removing the first feature and not removing the second feature; and
   displaying the modified acquired image for a person to view the real scene without the first feature,
   wherein identifying the at least first feature in the acquired image comprises:
      defining a virtual plane in the image that separates image features based on which side of the virtual plane the image features are located; and
      determining that the first feature is located on a particular side of the virtual plane,
   wherein the virtual plane is defined at a specific location in a passageway in the real scene such that any feature passing through the virtual plane in the passageway is only visible in the modified acquired image while on one of the first and second sides.

9. The non-transitory computer-readable storage media of claim 8, wherein:
   the operations further comprise identifying that a size of the first feature or a distance of the first feature from the camera corresponds to a size or distance, respectively, of features that have been specified for removal, and the first feature is removed from the acquired image in response to identifying that the size of the first feature or the distance of the first feature from the camera corresponds to the size or distance, respectively, of features that have been specified for removal.

10. The non-transitory computer-readable storage media of claim 8, wherein the virtual plane comprises a polygonal plane.

11. The non-transitory computer-readable storage media of claim 8, wherein the virtual plane spans an entirety of the acquired image.

12. The non-transitory computer-readable storage media of claim 8, wherein the virtual plane has a free-form shape and includes one or more holes that permit portions of image features that are located behind the one or more holes to not be removed from the image.

13. The non-transitory computer-readable storage media of claim 8, wherein the first feature comprises a face of a person.

14. The non-transitory computer-readable storage media of claim 8, wherein the camera comprises a surveillance camera.

15. The non-transitory computer-readable storage media of claim 8, wherein removing the first feature from the image comprises replacing the first feature with background features that simulate how the real scene would appear had the image been captured by the camera without the first feature being present in the real scene.

16. A computer-implemented system for selective viewing of a scene, the system comprising:
a camera; and
one or more computers configured to cause performance of operations comprising:
acquiring an image of a real scene using the camera;
identifying at least a first feature in the acquired image based on the first feature moving in the real scene, wherein the real scene further includes a second feature that is not moving in the real scene;
modifying the acquired image by removing the first feature and not removing the second feature; and
displaying the modified acquired image for a person to view the real scene without the first feature,
wherein identifying the at least first feature in the acquired image comprises:
defining a virtual plane in the image that separates image features based on which side of the virtual plane the image features are located; and
determining that the first feature is located on a particular side of the virtual plane,
wherein the virtual plane is defined at a specific location in a passageway in the real scene such that any feature passing through the virtual plane in the passageway is only visible in the modified acquired image while on one of the first and second sides.

* * * * *